(12) United States Patent
Schreuder et al.

(10) Patent No.: US 8,951,439 B2
(45) Date of Patent: Feb. 10, 2015

(54) PREPARATION OF NANOPARTICLES WITH NARROW LUMINESCENCE

(75) Inventors: Michael Alan Schreuder, Oxford (GB); Peter Neil Taylor, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 62 days.

(21) Appl. No.: 13/608,055

(22) Filed: Sep. 10, 2012

(65) Prior Publication Data

US 2013/0062565 A1    Mar. 14, 2013

(30) Foreign Application Priority Data

Sep. 14, 2011    (GB) .................................. 1115885.4

(51) Int. Cl.
*C01B 21/06* (2006.01)
*C09K 11/64* (2006.01)
*C09K 11/62* (2006.01)
*C09K 11/06* (2006.01)

(52) U.S. Cl.
CPC .............. *C09K 11/06* (2013.01); *Y10S 977/815* (2013.01); *Y10S 977/813* (2013.01)
USPC .............. 252/301.4 R; 252/301.6 R; 977/815; 977/813; 423/409; 423/412; 423/351

(58) Field of Classification Search
USPC ............ 252/301.4 R, 301.6 R; 423/409, 412, 423/351; 977/815, 813
See application file for complete search history.

(56) References Cited

U.S. PATENT DOCUMENTS

| | | | |
|---|---|---|---|
| 7,588,828 B2 * | 9/2009 | Mushtaq et al. | ............. 428/403 |
| 7,803,423 B2 | 9/2010 | O'Brien et al. | |
| 2005/0129947 A1 | 6/2005 | Peng et al. | |
| 2006/0019098 A1 | 1/2006 | Chan et al. | |
| 2006/0087048 A1 | 4/2006 | Mello et al. | |
| 2007/0104865 A1 | 5/2007 | Pickett | |
| 2008/0090385 A1 | 4/2008 | Bawendi et al. | |
| 2008/0220593 A1 | 9/2008 | Pickett et al. | |
| 2009/0004373 A1 | 1/2009 | Rath et al. | |

(Continued)

FOREIGN PATENT DOCUMENTS

| | | |
|---|---|---|
| EP | 1334951 A1 | 8/2003 |
| GB | 2467161 A | 7/2010 |

(Continued)

OTHER PUBLICATIONS

UK Search Report for corresponding UK Application No. GB1115885.4 dated Jan. 18, 2012.

(Continued)

*Primary Examiner* — Carol M Koslow
(74) *Attorney, Agent, or Firm* — Renner, Otto, Boisselle & Sklar, LLP

(57) ABSTRACT

A population of light-emissive nitride nanoparticles has a photoluminescence quantum yield of at least 10% and an emission spectrum having a full width at half maximum intensity (FWHM) of less than 100 nm. One suitable method of producing light-emissive nitride nanoparticles comprises a first stage of heating a reaction mixture consisting essentially of nanoparticle precursors in a solvent, the nanoparticle precursors including at least one metal-containing precursor and at least one first nitrogen-containing precursor, and maintaining the reaction mixture at a temperature to seed nanoparticle growth. It further comprises a second stage of adding at least one second nitrogen-containing precursor to the reaction mixture thereby to promote nanoparticle growth.

7 Claims, 3 Drawing Sheets

(56) References Cited

U.S. PATENT DOCUMENTS

| | | |
|---|---|---|
| 2009/0152567 A1 | 6/2009 | Comerford et al. |
| 2009/0162011 A1 | 6/2009 | Coe-Sullivan et al. |
| 2009/0278141 A1 | 11/2009 | Coe-Sullivan et al. |
| 2009/0283778 A1 | 11/2009 | Coe-Sullivan et al. |
| 2009/0295005 A1 | 12/2009 | Rauscher et al. |
| 2010/0068468 A1 | 3/2010 | Coe-Sullivan et al. |
| 2010/0243053 A1 | 9/2010 | Coe-Sullivan et al. |
| 2010/0265307 A1 | 10/2010 | Linton et al. |
| 2010/0283014 A1 | 11/2010 | Breen et al. |
| 2010/0283072 A1 | 11/2010 | Kazlas et al. |
| 2010/0314646 A1 | 12/2010 | Breen et al. |
| 2011/0233483 A1 | 9/2011 | Breen et al. |
| 2011/0245533 A1 | 10/2011 | Breen et al. |
| 2012/0025146 A1* | 2/2012 | Taylor et al. ............... 252/501.1 |

FOREIGN PATENT DOCUMENTS

| | | |
|---|---|---|
| GB | 2467162 A | 7/2010 |
| GB | 2482311 A | 2/2012 |
| WO | 02/053810 A1 | 7/2002 |
| WO | 03/054953 A1 | 7/2003 |
| WO | 2007/016193 A2 | 2/2007 |
| WO | 2008/094292 A1 | 8/2008 |
| WO | 2009/040553 A1 | 4/2009 |
| WO | WO 2010/085001 | 7/2010 |
| WO | WO 2010/085002 | 7/2010 |

OTHER PUBLICATIONS

UK Search Report for corresponding UK Application No. GB1115885.4 dated Aug. 30, 2012.

Manna et al., "Synthesis of Soluble and Processable Rod-, Arrow-, Teardrop-, and Tetrapod-Shaped CdSe Nanocrystals", American Chemical Society 2000, vol. 122, No. 51, pp. 12700-12706.

Dabbousi et al., "(CdSe)ZnS Core-Shell Quantam Dots: Synthesis and Characterization of a Size Series of Highly Luminescent Nanocrystallites", American Chemical Society, 1997, vol. 101, No. 46, pp. 9463-9475.

Li et al., "Economic Synthesis of High Quality InP Nanocrystals Using Calcium Phosphide as the Phosphorus Precursor", American Chemical Society, 2008, vo. 20, No. 8, pp. 2621-2623.

Murray et al., "Synthesis and Characterization of Nearly Monodisperse CdE (E=S, Se, Te) Semiconductor Nanocrystallites", American Chemical Society, 1993, vol. 115, No. 19, pp. 8706-8715.

Qu et al., "Control of Photoluminescence Properties of CdSe Nanocrystals in Growth", American Chemical Society, 2002, vol. 124, No., pp. 2049-2055.

Batagglia et al., "Formation of High Quality InP and InAs Nanocrystals in a Noncoordinating Solvent", American Chemical Society, 2002, vo. 2, No. 9, pp. 1027-1030.

Xu et al., "Rapid synthesis of highly luminescent InP and InP/ZnS nanocrystals", The Royal Society of Chemistry, 2008, 18, pp. 2653-2656.

Choi et al., "Low-temperature solvothermal synthesis of nanocrystalline indium nitride and Ga-In-N composites from the decomposition of metal azides", Journal of Materials Chemistry, 2006, DOI: 10.1039/b608204a.

Pan et al., "New Pyrolysis Route to GaN Quantum Dots", American Chemical Society, 2006, vol. 18, No. 17, pp. 3915-3917.

Gerbec et al., "Microwave-Enhanced Reaction Rates for Nanoparticle Synthesis", American Chemical Society, 2005, vol. 127, No. 45, pp. 15791-15800.

Grocholl et al., "Solvothermal Azide Decomposition Route to GaN Nanoparticles, Nanorods, and Faceted Crystallites", American Chemical Society, 2001, vol. 13, No. 11, pp. 4290-4296.

Janik et al., "Nanocrystalline Aluminum Nitride and Aluminum/Gallium Nitride Nanocomposites via Transamination of $[M(NMe_2)_3]_2$, M=Al, Al/Ga (1/1)", American Chemical Society, 1998, vol. 10, No. 6, pp. 1613-1622.

L.E. Brus, "A simple model for the ionization potential, electron affinity, and aqueous redox potentials of small semiconductor cyrstallites", American Institute of Physics, 1983, vol. 79, No. 11, pp. 5566-5571.

Yik-Khoon Ee et al., "Self-assembled InGaN quantum dots on GaN emitting at 520nm grown by metalorganic vapor-phase epitaxy", Journal of Crystal Growth, Jan. 31, 2008, 310, 2320-2325.

Liang-Wen Ji et al., "A novel method to realize InGaN self-assembled quantum dots by metalorganic chemical vapor deposition", Materials Letters, Dec. 31, 2003, 57, 4218-4221.

J. H. Rice, et al, Temporal variation in photoluminescence from single InGaN quantum dots, Applied Physics Letters, American Institute of Physics, May 5, 2004, vol. 84, pp. 4110-4112.

* cited by examiner

PREPARATION OF NANOPARTICLES WITH NARROW LUMINESCENCE

This nonprovisional application claims priority under 35 U.S.C. §119(a) on Patent Application No. 1115885.4 filed in the United Kingdom on Sep. 14, 2011, the entire contents of which are hereby incorporated by reference.

FIELD OF THE INVENTION

This invention relates to emissive semiconductor nanoparticles and their synthesis and in particular nitride semiconductor nanoparticles with narrow emission spectra and their synthesis. Such materials can be used in a wide range of applications including phosphor converted LEDs, emissive displays, solar cells, and bio-imaging.

BACKGROUND OF THE INVENTION

Semiconductor nanocrystals whose dimensions are comparable to the bulk exciton diameter show quantum confinement effects. This is seen most clearly in the optical spectra which shift towards the red and/or infrared as the size of the crystal is increased. The emission of nanocrystals is determined not only by the size of the nanocrystals, but by the uniformity of the nanocrystal sizes in a given group. Nanocrystals with a small size distribution (that is, with high uniformity of nanocrystal sizes) will provide narrow emission, while a large distribution of sizes within a nanocrystal group will provide wide emission.

Semiconductors nanocrystals made from a wide range of materials have been studied including many II-VI and III-V semiconductors. In addition to spherical nanocrystals rod-, arrow-, teardrop- and tetrapod-shaped nanocrystals [Alivisatos et. al., J. Am. Chem. Soc, 2000, 122, 12700; WO03054953] and core/shell structures [Bawendi, J. Phys. Chem. B, 1997, 1010, 9463; Li and Reiss, J. Am. Chem. Soc., 2008, 130, 11588] have also been prepared. To control the size and shape of such nanocrystals their synthesis is generally performed in the presence of one or more capping agents (sometime called surfactants or coordinating solvents). Such capping agents control the growth of the nanocrystals and also increase the intensity of the light emission though the passivation of surface states. A wide range of capping agents have been employed including phosphines [Bawendi et. al., J. Am. Chem. Soc., 1993, 115, 8706], phosphine oxides [Peng et. al., J. Am. Chem. Soc., 2002, 124, 2049], amines [Peng et. al., J. Am. Chem. Soc., 2002, 124, 2049], fatty acids [Battaglia and Peng, Nano Lett., 2002, 2, 1027; Peng et. al., J. Am. Chem. Soc., 2002, 124, 2049], thiols [Li and Reiss, J. Am. Chem. Soc., 2008, 130, 11588] and more exotic capping agents such a metal fatty acid complexes [Nann et. al., J. Mater. Chem., 2008, 18, 2653].

Methods to prepare semiconductor nanocrystals include solvothermal reactions [Gillan et. al., J. Mater. Chem., 2006, 38, 3774], hot injection methods [Battaglia and Peng, Nano Lett., 2002, 2, 1027], simple heating processes [Van Patten et. al., Chem. Mater., 2006, 18, 3915], continuous flow reactions [US2006087048] and microwave assisted synthesis [Strouse et. al., J. Am. Chem. Soc., 2005, 127, 15791]

Nitride nanocrystals have been synthesized using multiple nitrogen sources in the past; however, the nanocrystals produced have been of poor crystallinity and size quality [Gillan eta al., Chem. Mater., 2001, 13, 4290 and Wells, et al., Chem. Mater., 1998, 10, 1613]. Most importantly these nanocrystals have either exhibited no emission or very weak, broad emission, in one case a nanocrystal population had a peak width of nearly 300 nm at half the peak intensity (or full-width at half maximum, FWHM).

Emissive nitride nanocrystals have been produced before by Sharp Kabushiki Kaisha (UK patent application Nos. GB2467161 published 28 Jul. 2010, GB2482311 published 1 Feb. 2012, GB2467162 published 28 Jul. 2010). However, populations of these nanocrystals exhibited broad luminescence with FWHM of more than 110 nm.

Nanoco has previously proposed the synthesis of narrowly emissive nanocrystals through the use of molecular templates [Patents: EP1334951 published 13 Aug. 2003, U.S. Pat. No. 7,588,828 first published on 3 Jul. 2008, U.S. Pat. No. 7,803,423 first published on 30 Aug. 2008, US20070104865 published on 10 May 2007, and US20080220593 published on 11 Sep. 2008]. Nanoco propose separating the nucleation step of their precursors from the growth of their nanocrystals through the use of molecular precursor templates. They propose a process in which conversion of a precursor composition to nanoparticles is effected in the presence of a molecular cluster compound—this avoids the need for a high-temperature nucleation step to initiate nanoparticle growth because suitable nucleation sites are provided by the molecular clusters so that the molecules of the cluster compound act as a template to direct nanoparticle growth. In their synthesis, the growth of nanocrystals is initiated by the addition of at least 2 precursors to the already heated molecular cluster templates. The ions from these precursors then become part of the final nanocrystal products of the reaction, while the molecular cluster templates do not.

WO 02/053810 (published 11 Jul. 2002) proposes a method for the synthesis of quantum dot nanocrystals. It proposes that the final nanoparticle size, size distribution and yield can be controlled by introducing a reaction promoter into the reaction system. The reaction promoter is an oxygen-containing gas (ie oxygen gas itself or a gas mixture containing molecular oxygen, for example such as air).

GB 2467162 (published 28 Jul. 2010) proposes manufacturing a nitride nanostructure from constituents including: a material containing metal, silicon or boron, a material containing nitrogen, and a capping agent having an electron-accepting group for increasing the quantum yield of the nitride nanostructure. The reaction may be effected by providing all reaction constituents in a solvent and heating the reaction mixture to a desired temperature, or alternatively it may be effected by disposing some but not all constituents in the solvent, heating the mixture to the desired reaction temperature, and then introducing the remaining constituents into the heated mixture.

WO 2007/016193 (published 8 Feb. 2007) relates to a method of producing nanoparticles in which the reaction mixture is superheated, by microwaving the reaction mixture.

SUMMARY OF THE INVENTION

A first aspect of the invention provides a population of light-emissive nitride nanoparticles, the nanoparticles having a photoluminescence quantum yield of at least 10% and the population having an emission spectrum having a full width at half maximum intensity (FWHM) of less than 100 nm. In this application the term "nitride nanoparticles" denotes nanoparticles containing nitrogen anions. The invention is not limited to nanoparticles having nitrogen as their only anion, and may also be applied to nanoparticles having another anion in addition to nitrogen, for example to nanoparticles having the formula II-III-N-VI (such as ZnAlNS or ZnAlNO).

By a "population" is meant a number of nanoparticles, sufficiently large such that the FWHM of the emission spectrum has reached a limiting value. As noted a single light-emissive nanoparticle has a very narrow emission spectrum (and a single nanoparticle at absolute zero (0 K) is calculated to have an infinitely narrow emission spectrum), but a sample containing a large number of nanoparticles will have a broader emission spectrum owing to the different nanoparticles having different peak emission wavelengths owing to variations in size between different nanoparticles. As the number of nanoparticles in a nanoparticle population increases the FWHM will tend to a limit, and the present application makes it possible to obtain a nanoparticle population having an FWHM with a value, in the limit of large population size, of 100 nm, or below.

As noted above, while an individual nanoparticle has a very narrow emission spectrum, the emission spectrum of a population of nanoparticles is broadened owing to variations in size between nanoparticles of the population. The present invention provides nanoparticles having a more consistent size, so that variations in size between nanoparticles of the population are less than for prior art nanoparticles. As a result, the emission spectrum of a population of nanoparticles of the present invention is narrower than the emission spectrum of a prior art population of nanoparticles—and the invention makes possible a highly emissive, and narrowly emissive, population of light-emissive nitride nanoparticles, with nitrogen as the sole anion or in the presence of other anions.

Nanoparticle populations with narrow emission spectra are required when the nanoparticle populations are for use as light sources in applications where specific pure colours are required, for example, in high quality displays (eg for TVs, mobile devices such as tablets, etc) with a good colour gamut. (The broader the emission spectra of light sources in a display, for example, the fewer individual pure colours can be generated by the display.) In many applications nanoparticle populations with a FWHM are 100 nm or lower will, when used as light sources, provide an acceptable colour gamut whereas nanoparticle populations with a greater FWHM (such as 110 nm) have emission spectra that are too broad to provide displays with a good colour gamut. If nanoparticle populations with a FWHM lower than 100 nm are used (such as nanoparticle populations with an FWHM of 90 nm or lower, or 80 nm or lower, or even 70 nm or lower), the reduced FWHM means that an improved colour gamut is obtained. Thus a nanoparticle population of the present invention, with its low FWHM, is useful in applications where specific pure colours are needed.

Where nanoparticle populations are for use as light sources, the photoluminescent quantum yield (PLQY) of the nanoparticle populations is also of importance. The higher the PLQY of a nanoparticle population, the more efficient is the nanoparticle population when used as a light source—thus, a device that incorporates nanoparticle populations having high PLQYs will be more efficient than one incorporating nanoparticle populations with low PLQYs. In many applications nanoparticle populations with a PLQY of 10% or above will, when used as light sources, provide a device with an acceptable efficiency whereas nanoparticle populations with a lower PLQY will not. If nanoparticle populations with a PLQY greater than 10% are used (such as nanoparticle populations with an FWHM of 20% or greater, or 30% or greater, or even 40% or greater or 50% or greater), the greater PLQY FWHM means that a more efficient device is obtained.

A second aspect of the present invention provides a method of producing light-emissive nitride nanoparticles, the method comprising:

(a) heating a reaction mixture consisting essentially of nanoparticle precursors in a solvent, the nanoparticle precursors including at least one metal-containing precursor and at least one first nitrogen-containing precursor, and maintaining the reaction mixture at a temperature to seed nanoparticle growth; and (b) adding at least one second nitrogen-containing precursor to the reaction mixture thereby to promote nanoparticle growth.

The term "metal" as used herein is intended to also include the so-called "semi-metals", such as arsenic, bismuth, boron, silicon, etc The term "nitrogen-containing precursor" as used herein denotes a constituent of the reaction mixture that provides a source of nitrogen for the reaction. The term "metal-containing precursor" as used herein has an analogous meaning.

It has been found that this growth method provides good uniformity of nanoparticle size, that is less variation in size between nanoparticles. The method may therefore be used to obtain a nanoparticle population that is highly emissive but that has a narrower emission spectrum than prior nanoparticle populations. It is believed that, the method generates a narrower size distribution for the nanoparticles by either a) creating nanocrystal seedlings in the first step which are then grown quickly upon the addition of the $2^{nd}$ nitrogen containing precursor or b) the first step produces a precursor which can be quickly nucleated upon addition of the $2^{nd}$ nitrogen-containing precursor.

Compared to the prior art Nanoco methods described above, the present invention requires the addition of only a nitrogen-containing precursor (or a mixture of nitrogen-containing precursors) to initiate the growth step of the nanocrystal reaction—addition of this nitrogen-containing precursor (or mixture of nitrogen-containing precursors) to the reaction mixture is sufficient to initiate the growth step, and it is not necessary to add any metal-containing precursor to initiate the growth step. Additionally, the precursors present in stage (a) of the reaction, which are heated prior to the addition of the second nitrogen-containing precursor(s), provide constituents of the final nanoparticles.

Moreover, a method of the invention may be performed without using a molecular cluster compound to provide nucleation sites for nanoparticle growth. The reaction mixture need consist essentially of only precursor materials to provide the constituents of the nanoparticles and a ligand precursor (or "capping agent"), and a solvent. The initial stage of the method is by itself effective to seed nanoparticle growth, and there is no need to include a molecular cluster compound in the reaction mixture to provide nucleation sites.

The method may comprise maintaining the reaction mixture at a temperature of at least 200° C. in stage (a), or of at least 250° C. in stage (a).

The reaction mixture may further comprise a second metal-containing precursor. This allows nitride nanoparticles containing two different metal ions, such as ZnAlN nanoparticles, to be produced.

The second nitrogen-containing precursor(s) may be different from the first nitrogen-containing precursor(s). Alternatively, the second nitrogen-containing precursor(s) may be the first nitrogen-containing precursor(s)—that is, the same nitrogen-containing precursor(s) may be used in both stages.

The reaction mixture may further comprise a ligand precursor.

The solvent may be a solvent such as dibutyl sebacate, a phosphine, a phosphine-oxide, mineral spirits, or octadecene;

or more specifically the solvent may be octadecene (ODE). Using such a solvent avoids the need to perform the reaction in a pressure vessel.

A third aspect of the invention provides a nitride nanoparticle produced by a method of the second aspect.

This invention discloses highly emissive nitride nanocrystals, which have been prepared for the first time with a narrow spectral emission and a synthesis method of the same. This narrowed spectral emission and observation of an exciton peak in the absorption spectra indicate that a smaller size distribution of nanoparticles has been achieved (FIGS. 1, 2, and 3).

In addition to the strong emission previously seen from nitride nanoparticles, the spectral emission is more narrow leading to higher quality colours. In particular, a more pure green or blue emission is clearly visible from these nanoparticles than has been seen before. This is a significant advantage over the prior art.

Nitride nanocrystals are particles which have dimensions below 100 nm in any direction and contain nitrogen as an anion. These particles may be comprised of an inorganic core with organic ligands. "Highly emissive" in this case means having an emissive quantum yield of greater than 10%. "Narrowly emissive" indicates that the FWHM is less than 100 nm.

The "photoluminescence quantum yield" (PLQY or simply QY) of a semiconductor nanoparticle is the ratio, when the nanoparticle is illuminated by an exciting light source to cause the nanoparticle to photoluminescence, of the number of photons emitted by the nanoparticle to the number of photons absorbed by the nanoparticle.

In particular, the QY may be greater than 20%. In particular, the QY may be greater than 30%. In particular the QY may be greater than 40%. In particular, the QY may be greater than 50%. To date, nanoparticle populations having a QY of up to 53.5% have been obtained according to the invention, although this is not believed to be the highest QY obtainable by the present invention. In particular, the FWHM may be less than 90 nm. In particular, the FWHM may be less than 80 nm. In particular, the FWHM may be less than 70 nm. To date, nanoparticle populations having an FWHM of as low as 64 nm have been obtained according to the invention, although this is not believed to be the lowest FWHM obtainable by the present invention. A nanoparticle population with an FWHM narrower than 100 nm and with a QY greater than 10% is not known in the prior art.

In order to fabricate these more narrowly emissive nanocrystals, a new synthetic method has been devised. Primarily this new synthetic method is composed of a seeding step and a growth step for the nanocrystals (FIG. 4). Each step uses a nitrogen precursor to promote either seeding (in the first step) or growth (in the second step). Different nitrogen precursors may be used for the two steps, although in some cases the nitrogen precursor may be the same for both steps.

Moreover, one or both steps may use a mixture of two or more nitrogen precursors rather than a single nitrogen precursor. If both steps use a mixture of two or more nitrogen precursors, the mixtures of nitrogen precursors used for the two stages may be the same, may have a component in common, or may be completely different from one another (ie have no component in common).

In particular, in one embodiment a group-II precursor, a group-III precursor, a nitrogen precursor, a ligand precursor, and are solvent are heated together. This is the initial "seeding" step. After some time, a $2^{nd}$ nitrogen precursor is added and the "growth" step begins. After some time the nanocrystal reaction is cooled and the nanocrystals in solution are collected. They may then be separated from the remaining precursors and bi-products for use. This provides nanoparticles having the formula II-III-N where II denotes a group II element and III denotes a group III element. The invention may also be effected using two or more group-II precursors and/or using two or more group-III precursors, to obtain nanoparticles containing two or more group II elements and/or two or more group III elements.

If the invention is applied to nanoparticles having another anion in addition to nitrogen, such as II-III-N-VI nanoparticles, a precursor of the another anion is also provided in the reaction mixture (this precursor would be provided in the reaction mixture for the initial stage since, as noted, it is necessary to add only a nitrogen-containing precursor to initiate the second stage of the growth process).

This invention provides nitride nanocrystals which have narrow and bright emission. Nitride nanocrystals described in the prior art are not highly emissive and/or have a broad emission, particularly for those nanocrystals emitting at peak wavelengths of 400-600 nm.

Compared to other semiconductors the nitrides span a wider range of the electromagnetic spectrum and like other III-V materials they have large exciton diameters suggesting they should have more pronounced quantum size effects on their optical spectra [Brus, J. Chem. Phys., 1983, 33, 6976]. At the present time the majority of narrow and highly emissive nanocrystals are composed of II-VI materials such as cadmium sulfide, cadmium selenide and lead sulfide. The presence of highly toxic heavy metals in these materials also gives the nitride nanocrystals of the present invention a significant advantage over the prior art. Ever tightening regulations and consumer awareness make using toxic materials in consumer products increasingly difficult. Another advantage is the low cost of all the starting materials used to prepare the nanocrystals described here and the simple procedures used to prepare the nanocrystals.

The narrow emission spectra of these nanocrystals of the invention can be exploited in a number of applications. In illumination systems narrow emission lines enable precise control of the chromaticity of the light source. In display systems narrow emission lines enable a wider range of more saturated colours to be displayed than with broad band emitters.

Although we have shown cases for blue and green emission colours, we believe that our method, with slight chemical modification, provides a route to any colour emission from ultraviolet to infrared.

DESCRIPTION OF THE PREFERRED EMBODIMENTS

Figure 1:
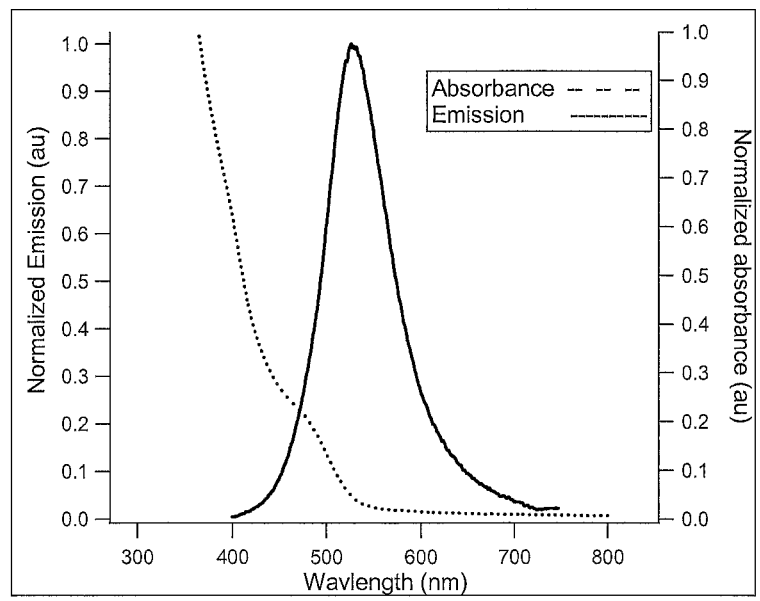
FIG. 1 An emission and absorption spectra of some of the nanocrystals prepared in Example 1
Figure 2:
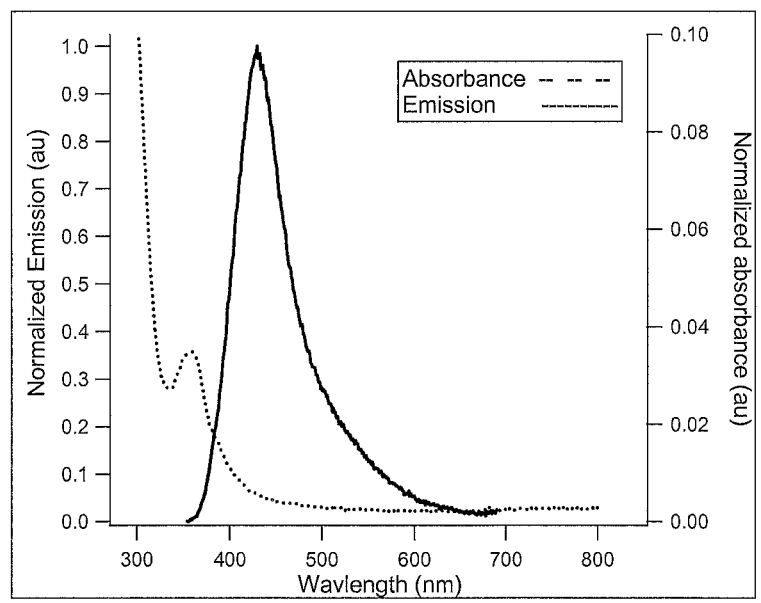
FIG. 2 An emission and absorption spectra of some of the nanocrystals prepared in Example 2
Figure 3:
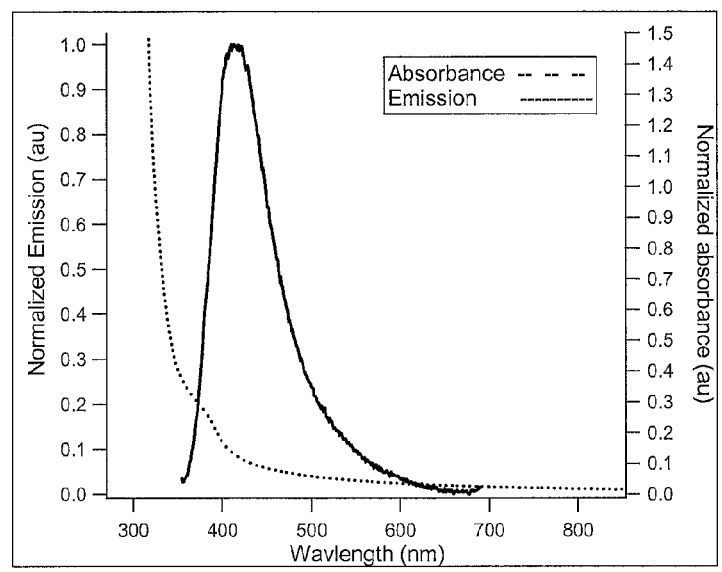
FIG. 3 An emission and absorption spectra of some of the nanocrystals prepared in Example 3.
Figure 4:
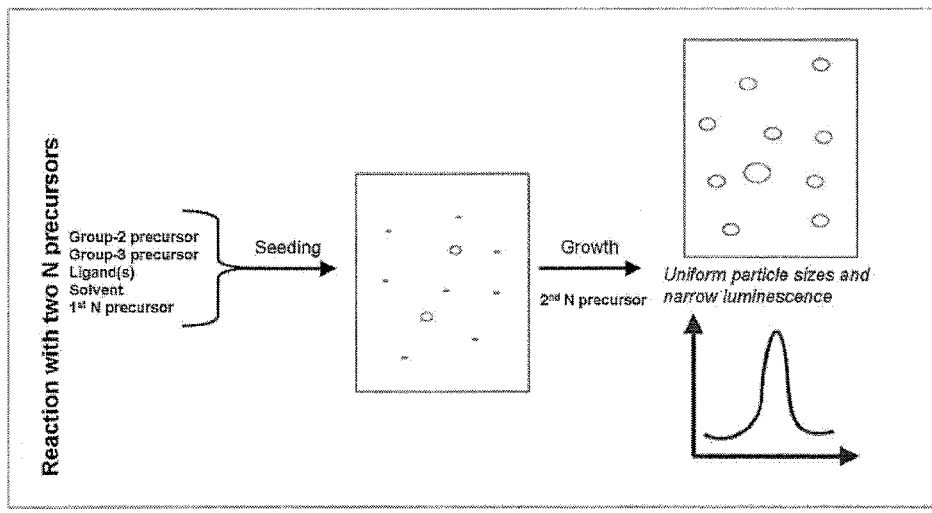
FIG. 4 Schematic showing the synthetic method of the current invention for making narrowly and highly emissive nanocrystals.

Any suitable metals or semi-metals may be used, in particular metals from group IIB and IIIA may be used. Other non-metallic elements in addition to nitrogen may also be used such as other elements from group VA and elements from group VIA. In particular elements from groups IIB, IIIA and nitrogen may be used. More specifically the invention may be applied to nanoparticles composed of materials such as ZnGaN, ZnInN, ZnInGaN, ZnAlN, ZnAlGaN, ZnAl—InN and ZnAlGaInN.

Moreover, as noted above, the invention is not limited to nanocrystals having nitrogen as their only anion, and may be applied to nanoparticles having another anion in addition to nitrogen, for example to nanoparticles having the formula II-III-N-VI such as ZnAlNS or ZnAlNO.

In particular, the QY may be greater than 20%. In particular, the QY may be greater than 30%. In particular the QY may be greater than 40%. In particular, the QY may be greater than 50%. In particular the QY may be 53.5%. In particular, the FWHM may be less than 90 nm. In particular, the FWHM may be less than 80 nm. In particular, the FWHM may be less than 70 nm. In particular, the FWHM may be 64 nm. Nitride nanocrystals with emission spectra with a FWHM narrower than 100 nm and with a QY greater than 10% are not known in the prior art.

In one example a group-II precursor, a group-III precursor, a nitrogen precursor, a ligand precursor, and a solvent are heated together. This is the initial "seeding" stage. After some time, a $2^{nd}$ nitrogen precursor is added and the "growth" stage begins. After some further time the nanocrystal reaction is cooled and the nanocrystals in solution are collected. They may then be separated from the remaining precursors and bi-products for use.

Any suitable precursor materials may be used.

In particular the group-II precursor may be a group-II carboxylate; or more specifically the group-II precursor may be a Zn-carboxylate; or more specifically the group-II precursor may be Zn-stearate.

In particular the group-III precursor may be a group-III halide; or more specifically the group-III precursor may be a group-III iodide; or more specifically the group-III precursor may be an $AlI_3$, $GaI_3$ or $InI_3$; or more specifically the group-III precursor may be $AlI_3$.

In particular the ligand precursor may be a group-VI-containing ligand; or more specifically the ligand precursor may be a thiol-; or more specifically the ligand precursor may be hexadecanethiol.

In particular the solvent may be a solvent such as dibutyl sebacate, a phosphine, a phosphine-oxide, mineral spirits, or octadecene; or more specifically the solvent may be octadecene (ODE).

In particular the first nitrogen containing precursor maybe a metal amide salt; or more specifically the first nitrogen containing precursor maybe a group-I amide salt; or more specifically the first nitrogen containing precursor maybe a lithium- or sodium-amide salt; or more specifically the first nitrogen containing precursor may have the formula $LiNR_2$ or $NaNR_2$, where R is any alkane, alkene, alkyne, phenyl group, benzyl group, a proton, alcohol, ketone, aldehyde, acyl halide, carbonate ester, carboxylate, carboxyl group, ester, peroxide, ether, acetal, ketal, amine, amide, imine, imide, azide, azo, cyanate, isocyanate, nitrate, nitrile, isonitrile, nitro or nitroso group, pyridyl, thiol, sulfide, disulfide, sulfinyl, sulfonyl, sulfino, sulfo, thiocyanate, isothiocyanate, thione, and/or a thioaldehyde group.

In particular the second nitrogen containing precursor maybe a metal amide salt; or more specifically the second nitrogen containing precursor maybe a group-I amide salt; or more specifically the second nitrogen containing precursor maybe a lithium- or sodium-amide salt; or more specifically the second nitrogen containing precursor may have the formula $LiNR_2$ or $NaNR_2$, where R is any alkane, alkene, alkyne, phenyl group, benzyl group, a proton, alcohol, ketone, aldehyde, acyl halide, carbonate ester, carboxylate, carboxyl group, ester, peroxide, ether, acetal, ketal, amine, amide, imine, imide, azide, azo, cyanate, isocyanate, nitrate, nitrile, isonitrile, nitro or nitroso group, pyridyl, thiol, sulfide, disulfide, sulfinyl, sulfonyl, sulfino, sulfo, thiocyanate, isothiocyanate, thione, and/or a thioaldehyde group.

EXAMPLES

Below are described three examples which have been successfully tested and support this patent application.

Example 1

Colloidal Nitride Nanocrystal Synthesis ($NaN[CN]_2$)

Figure 5:
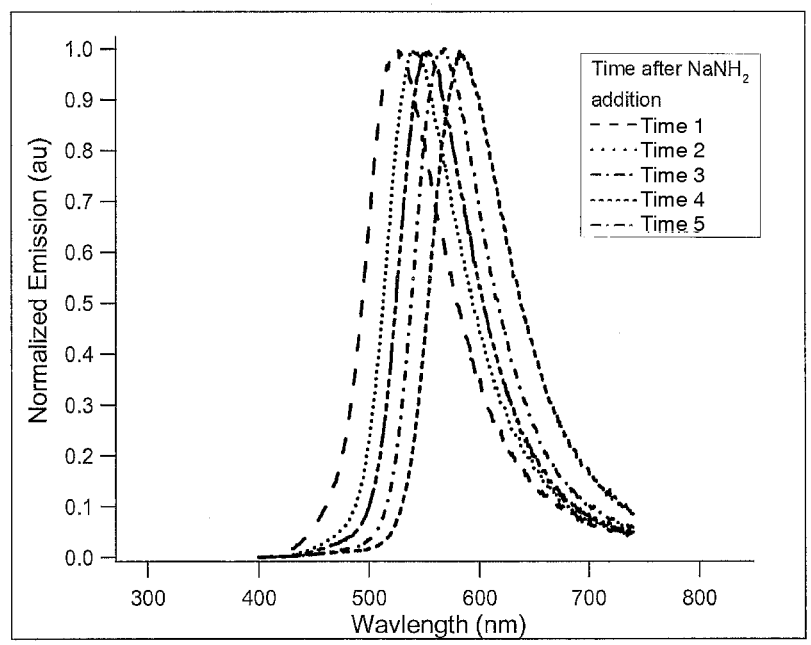
FIG. 5 Emission spectra from various aliquots taken from a single reaction of Example 1 at different times.

In a 50 mL flask, aluminium iodide (0.25 mmole), zinc-stearate (0.75 mmole), sodium dicyanamide (5.00 mmole), hexadecanethiol (2 mmole), and octadecene (25 mL) were stirred and heated at 255° C. for 1 hour and 15 min. At this time, sodium amide (10 mmole) was added quickly in powder form. The reaction was then allowed to proceed with small aliquots being taken at various times and diluted with toluene. The resulting solutions were analysed by a Flouromax-4 spectrofluorometer; these solutions showed a change in the peak emission over the course of the reaction. This is shown in FIG. 5, in which each of the emission spectrum was obtained after the emission spectrum to its left in the figure—as the reaction time increases the nanoparticle size increases, and the peak emission wavelength increases.

The resulting nanocrystals could then be purified by a multi-step centrifugation process of the reaction mixture. Initially, the nanocrystal mixture was centrifuged and the resulting liquid decanted into new centrifuge tubes leaving the side-products as a pellet. This solution was mixed with acetonitrile and toluene to flocculate the nanocrystals, prior to further centrifugation. The liquid was decanted off and the pellet dried under reduced pressure. The nanocrystals were then suspended in toluene and centrifuged to remove any remaining contaminants. A repeat of the flocculation/suspension steps could then be performed or the nanocrystals used in this form.

Figure 6:
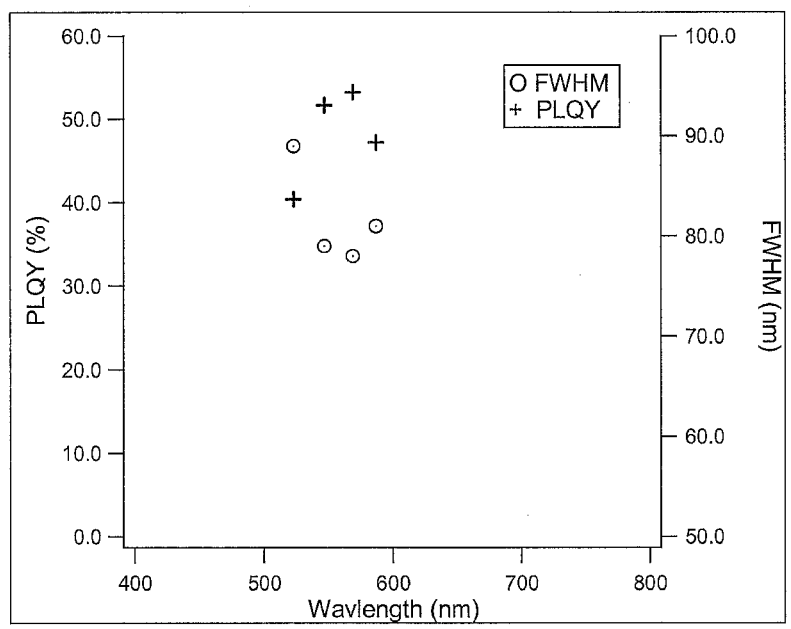
FIG. 6 Graph showing the QY and FWHM of various aliquots taken from a single reaction of Example 1 vs. the peak wavelength of their emission.

The photoluminescent quantum yield of the nanocrystals was measured as compared to a Nile red solution in 1,4-dioxane. A graph showing the PLQY from several of the pulls from a single reaction is shown in FIG. 6.

Example 2

Colloidal Nitride Nanocrystal Synthesis ($LiN[CH2CH3]_2$)

In a 50 mL flask, aluminium iodide (0.25 mmole), zinc-stearate (0.75 mmole), lithium diethylamide (5.00 mmole), hexadecanethiol (2 mmole), and octadecene (25 mL) were stirred and heated at 255° C. for 1 hour and 15 min. At this time, sodium amide (10 mmole) was added quickly in powder form. The reaction was then allowed to proceed with small aliquots being taken at various times and diluted with toluene. The resulting solutions were analysed by a Flouromax-4 spectrofluorometer; these solutions showed a change in the peak emission over the course of the reaction.

Example 3

Colloidal Nitride Nanocrystal Synthesis (LiN[CH3]$_2$)

In a 50 mL flask, aluminium iodide (0.25 mmole), zinc-stearate (0.75 mmole), lithium dimethylamide (5.00 mmole), hexadecanethiol (2 mmole), and octadecene (25 mL) were stirred and heated at 255° C. for 1 hour and 15 min. At this time, sodium amide (10 mmole) was added quickly in powder form. The reaction was then allowed to proceed with small aliquots being taken at various times and diluted with toluene. The resulting solutions were analysed by a Flouromax-4 spectrofluorometer; these solutions showed a change in the peak emission over the course of the reaction.

Although the flask size, temperature, time of reaction, form of sodium amide, and solvent for pulls are described in the above examples specifically, they are meant as guides and the invention is not limited to these. For example, the reaction temperature of 255° C. used in the Examples is only one example of a suitable temperature and other temperatures could be used. Good results have been obtained for a reaction temperature of 230° C. or above, but it is expected that any reaction temperature greater than around 200° C. should provide good results.

INDUSTRIAL APPLICABILITY

A nanoparticle population of the present invention, or obtained by a method of the present invention may be used as a light source in display devices such a television or portable devices such as tablets. The lower FWHM of a nanoparticle population of the present invention means that a device in which nanoparticle populations of the invention are used as light sources have an improved colour gamut, and the higher PLQY of a nanoparticle population of the present invention means that a device in which nanoparticle populations of the invention are used as light sources have a greater efficiency.

The invention claimed is:

1. A method of producing light-emissive nitride nanoparticles, the method comprising:
   (a) heating a reaction mixture consisting essentially of nanoparticle precursors in a solvent, the nanoparticle precursors including at least one metal-containing precursor and at least one first nitrogen-containing precursor, and maintaining the reaction mixture at a temperature of at least 200° C.; and
   (b) adding an addition to the reaction mixture, the addition consisting essentially of one or more second nitrogen-containing precursors to thereby promote nanoparticle growth, whereby the nanoparticle is grown from reacting together the at least one metal-containing precursor, the at least one first nitrogen-containing precursor, and the at least one second nitrogen-containing precursor.

2. The method as claimed in claim 1 and comprising maintaining the reaction mixture at a temperature of at least 250° C. in stage (a).

3. The method as claimed in claim 1 wherein the reaction mixture further comprises a second metal-containing precursor.

4. The method as claimed in claim 3 wherein the second nitrogen-containing precursor(s) is/are different from the first nitrogen-containing precursor(s).

5. The method as claimed in claim 3 wherein the second nitrogen-containing precursor(s) is/are the first nitrogen-containing precursor(s).

6. The method as claimed in claim 1 wherein the reaction mixture further comprises a ligand precursor.

7. The light-emissive nitride nanoparticle produced by the method as defined in claim 1.

* * * * *